Jan. 26, 1960  R. E. HULTEN  2,922,493
OIL PUMP MOUNTING
Filed June 6, 1958  3 Sheets-Sheet 2

INVENTOR.
Richard E. Hulten
BY
ATTORNEY

Jan. 26, 1960  R. E. HULTEN  2,922,493
OIL PUMP MOUNTING

Filed June 6, 1958  3 Sheets-Sheet 3

INVENTOR.
Richard E. Hulten
BY
ATTORNEY

United States Patent Office 2,922,493
Patented Jan. 26, 1960

2,922,493
OIL PUMP MOUNTING

Richard E. Hulten, Pontiac, Mich., assignor to General Motors Corporation, Detroit, Mich., a corporation of Delaware Application June 6, 1958, Serial No. 740,415

3 Claims. (Cl. 184—6)

This invention relates to engines for motor vehicles and has particular relation to front mounted engines of conventional design but modified to provide a minimum of road clearance for application to vehicle passenger compartments of minimum height but adequate interior capacity.

It is proposed to lower the engine of a motor vehicle by placing the oil sump at the front end of the engine but retaining the oil pump at the rear of the engine, where it is more convenient to operate the oil pump and where a better over-all engine design may be provided. However, with the oil sump at the front end of the engine and the engine sloping downwardly toward the rear of the vehicle, there is not sufficient room inside the oil pan to conveniently mount and to operate the oil pump. It is therefore proposed to dispose the oil pump externally of the oil pan, to seal the oil pump with respect to the oil pan, but to mount the oil pump within the oil pan and to the engine frame where sufficient rigidity is provided. It is also proposed to have the mounting for the oil pump in the vicinity of the oil pump drive shaft which may extend through a sealed opening in the oil pan and into the oil pump casing.

In the drawings:

Figure 1 is a fragmentary side elevational view of a V-type automative engine with parts thereof broken away to better illustrate the interior structure of the engine.

Figure 2 is an enlarged fragmentary end view of the engine as the engine might appear beneath the crankshaft and from the rear end of the engine. Parts of the structure also are broken away to better illustrate the interior of the engine. Figure 2 is taken substantially in the plane of line 2—2 of Figure 1 looking in the direction of the arrows thereon.

Figure 3 is taken substantially in the plane of line 3—3 of Figure 1 looking in the direction of the arrows thereon.

Figure 1:
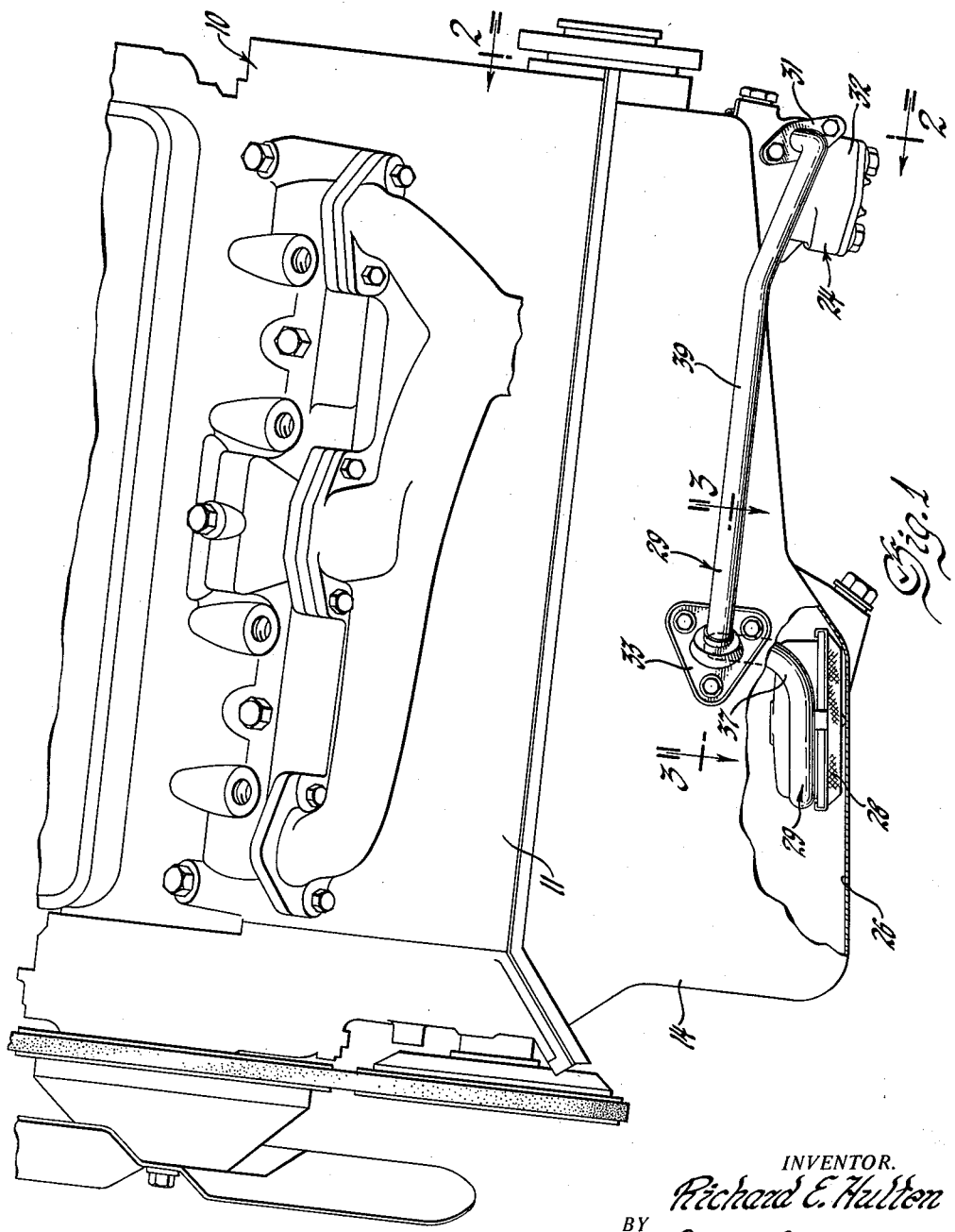

The engine 10 embodying the invention is a V-type eight cylinder spark ignited internal combustion engine of the type now generally employed in motor vehicles. The engine 10 has the usual lubricating, cooling, intake, exhaust, ignition, timing and other systems embodied in such engines. The engine frame 11 has a cavity in the lower part thereof and extending lengthwise of the frame and in which the upper part of the crankcase 12 for the engine 10 is formed. The lower part of the crankcase 12 is formed in the oil pan 14, the latter being secured to the frame 11 around the aforesaid cavity. The engine has a crankshaft 16 mounted in bearings 17 formed in the frame, the rear bearing being provided with a gasket 18 to prevent leakage of oil from the oil pan 14.

The ignition system of the engine also is provided with a distributor driven by the camshaft of the engine and having a coupling from which the oil pump drive shaft 19 of the engine is driven. The shaft 19 extends downwardly at the rear of the engine where there is sufficient room to locate the drive means for the distributor and oil pump and to locate the oil pump for the engine.

A transverse wall 21 of the frame 11 supports a bracket 22 which is secured to the lower edge of the wall 21 by bolts 23. The bracket 22 supports the oil pump 24 for the engine, the oil pump being located outside the oil pan 14 and in such position as to be readily available for service. The position of the oil pump 24 is not materially lower than the lower part of the oil sump which is formed at the front end of the oil pan 14.

The pump 24 preferably has a screened inlet 28 in sump 26, the inlet 28 being at the front end of an inlet conduit 29 connected at 31 to the casing 32 of the pump 24.

Figure 2:
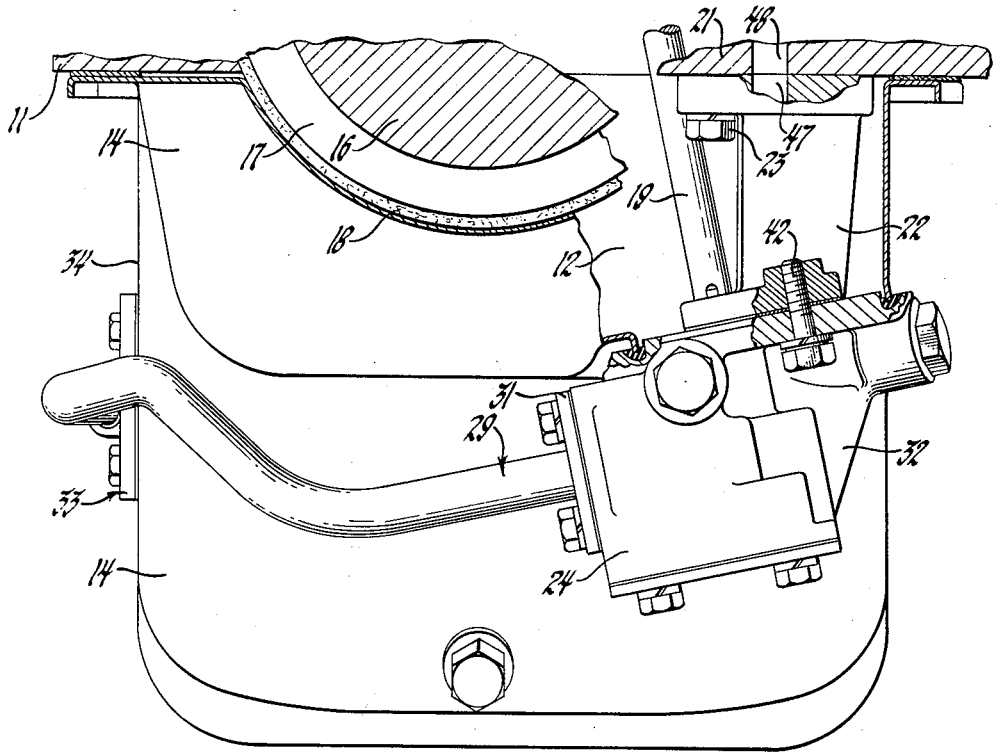
Figure 3:
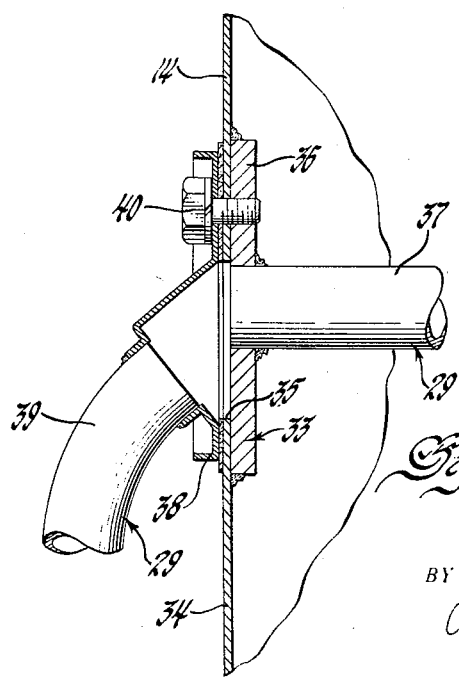
Figure 3 is a fragmentary cross-sectional view of a part of the pump inlet conduit means embodied in the structure disclosed by Figures 1 and 2 and illustrating where the inlet conduit means traverses a side wall of the oil pan for the engine.

In the embodiment shown by Figures 1, 2 and 3, the inlet conduit extends through a fitting 33 in a side wall 34 of the oil pan 14, from the interior to the exterior of the oil pan 14.

Figure 4:
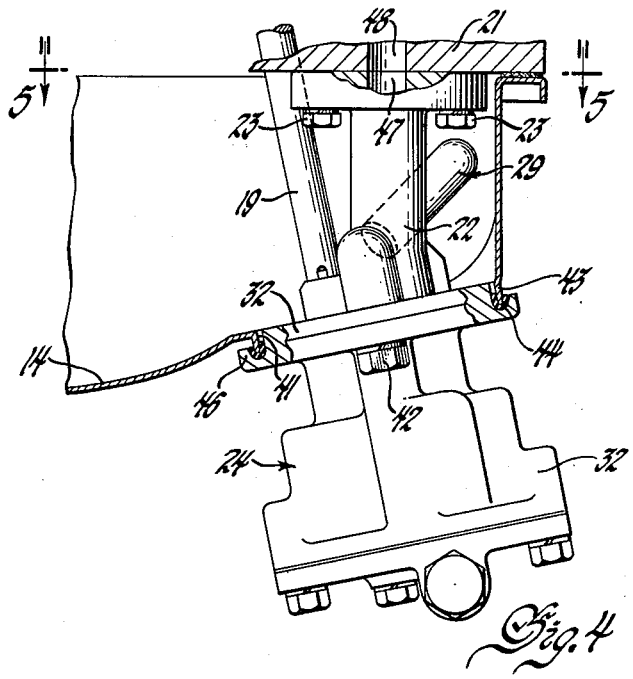
Figures 4 and 5 are fragmentary views of a modification of the structure shown by the preceding figures.
Figure 5:
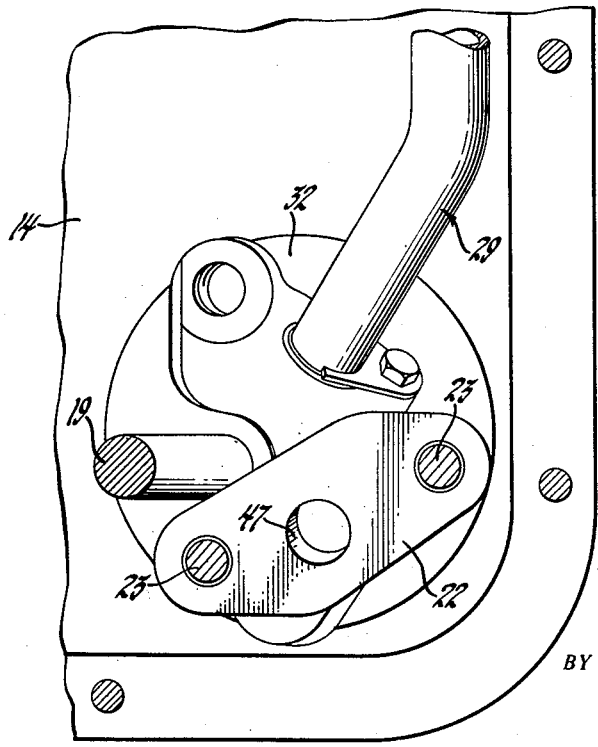

In the modification disclosed by Figures 4 and 5, the inlet conduit 29 remains within the oil pan 14 from the screened inlet to the pump casing 32.

The fitting 33 may be made in two parts, there being an inner flange part 36 secured to the inner part 37 of the conduit 29 and an outer flange part 38 secured to an outer part 39 of the conduit 29. The parts 36 and 38 may be secured together by bolts 40 and upon the side wall 34 and over an opening 35 in the side wall 34.

In the modification shown by Figures 4 and 5, the conduit 29 may be a one-piece conduit.

In either form of the invention, the oil pan 14 is provided with a flanged opening 41 at the shallow end of the oil pan, for receiving the pump casing 32, so that the pump casing may be secured by bolts 42 to the bracket 22. The opening 41 is surrounded by a flange 43 which is adapted to project into engagement with a grooved rubber or other suitable grommet 44 disposed in an annular recess formed around the flanged edge 46 of the upper part of the casing 32. The flange 43 is tightened against the grommet 44 when the bolts 42 are tightened to secure the casing 32 to the bracket 22.

The pump 24 is driven by the shaft 19 when the crankshaft 16 of the engine is turning and supplied oil from the sump 26 through the inlet conduit 29 to the lubricating system of the engine. The pump outlet 47 is formed in the bracket 22 and communicates with passage 48 terminating in the lower edge of the wall 21 to which the bracket 22 is secured.

I claim:

1. An internal combustion engine having a lubricating system and comprising an engine frame having an oil pump drive shaft projecting from the lower part and at the rear end thereof, said engine being adapted to be mounted in a motor vehicle with the axis of the crankshaft inclined downwardly toward the rear of said vehicle, an oil pan covering the lower part of said frame and having an oil sump at the front end of said engine and having an opening in alignment with said drive shaft, a mounting bracket disposed within said oil pan and having a lower part within said opening, an oil pump supported by said mounting bracket and being secured to and sealed against said oil pan around said opening, said oil pump having an outlet extending through said oil pan and communicating with said lubricating system of said engine, and conduit means having an inlet in the lower part of said oil sump and communicating with said pump, said pump being driven by said drive shaft to supply oil to said lubricating system through said inlet and said outlet and from said oil sump at the front end of said engine.

2. An internal combustion engine having a lubricating system and comprising an engine frame having an oil pump drive shaft projecting from the lower part and at the rear end thereof, said engine being adapted to be mounted in a motor vehicle with the axis of the crankshaft thereof inclined downwardly toward the rear of said vehicle, an oil pan covering the lower part of said frame having an oil sump at the front end of said engine and having an opening in alignment with said drive shaft, a mounting bracket disposed within said oil pan and having a lower end terminating within said opening, an oil pump supported by said mounting bracket and being secured to and sealed against said mounting bracket and to said oil pan around said opening, said oil pump having an outlet extending through said bracket and communicating with said lubricating system of said engine, and conduit means having an inlet in the lower part of said oil sump and communicating with said pump, said pump being driven by said drive shaft to supply oil to said lubricating system through said inlet and said outlet and from said oil sump at the front end of said engine.

3. An internal combustion engine having a lubricating system and comprising an engine frame having an oil pump drive shaft projecting from the lower part and at the rear end thereof, said engine being adapted to be mounted in a motor vehicle with the axis of the crankshaft thereof inclined downwardly toward the rear of said vehicle, an oil pan covering the lower part of said frame and having an oil sump at the front end of said engine and having an opening in alignment with said drive shaft, a mounting bracket disposed within said oil pan and having a lower part within said opening, an oil pump supported by said mounting bracket and being secured to and sealed against said oil pan around said opening, said oil pump having an outlet communicating with said lubricating system of said engine, and conduit means having an inlet in the lower part of said oil sump and communicating with said pump, said conduit means being formed to extend outwardly through a wall of said oil pan and being connected outwardly of said oil pan to said pump, said pump being driven by said drive shaft to supply oil to said lubricating system through said inlet and said outlet and from said oil sump at the front end of said engine.

References Cited in the file of this patent

UNITED STATES PATENTS

| | | |
|---|---|---|
| 1,104,057 | Marr | July 21, 1914 |
| 1,416,490 | Monsen | May 16, 1922 |
| 1,686,839 | Rhoads | Oct. 9, 1928 |
| 1,711,297 | Wiltse | Apr. 30, 1929 |